(12) United States Patent
Long et al.

(10) Patent No.: US 8,827,204 B2
(45) Date of Patent: Sep. 9, 2014

(54) CLUTCH SYSTEM FOR ROTARY-WING AIRCRAFT WITH SECONDARY THRUST SYSTEM

(75) Inventors: Charles E. Long, Rockford, IL (US); Dean A. Norem, Cherry Valley, IL (US); Raymond N. Weyl, Rockford, IL (US); Ricky D. Reimers, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 139 days.

(21) Appl. No.: 13/349,059

(22) Filed: Jan. 12, 2012

(65) Prior Publication Data
US 2013/0181087 A1    Jul. 18, 2013

(51) Int. Cl.
B64D 35/00    (2006.01)
B64C 27/22    (2006.01)
B64C 29/00    (2006.01)

(52) U.S. Cl.
USPC ............. 244/60; 244/6; 244/8; 244/12.3; 244/23 B

(58) Field of Classification Search
USPC .................. 244/60, 6, 8, 12.3, 23 B
See application file for complete search history.

(56) References Cited

U.S. PATENT DOCUMENTS

| | | | |
|---|---|---|---|
| 1,851,146 A | 3/1932 | Banker | |
| 3,677,378 A * | 7/1972 | Troeger | 192/54.51 |
| 3,679,033 A * | 7/1972 | Wagner | 192/48.7 |
| 4,046,235 A | 9/1977 | Shutt | |
| 4,216,848 A | 8/1980 | Shimodaira | |
| 4,219,107 A | 8/1980 | Ford | |
| 4,632,081 A * | 12/1986 | Giuliani et al. | 123/198 F |
| 4,798,052 A | 1/1989 | McAfee | |
| 5,318,245 A | 6/1994 | Sato et al. | |
| 5,529,459 A | 6/1996 | Pancotti | |
| 5,853,152 A | 12/1998 | Evans et al. | |
| 5,855,471 A | 1/1999 | Chory | |
| 6,019,578 A * | 2/2000 | Hager et al. | 416/87 |
| 6,030,177 A * | 2/2000 | Hager | 416/87 |
| 6,077,042 A | 6/2000 | Pancotti et al. | |
| 6,193,464 B1 | 2/2001 | Nyhus et al. | |
| 6,991,072 B2 | 1/2006 | Bonfils | |
| 7,083,142 B2 | 8/2006 | Scott | |
| 7,168,533 B2 | 1/2007 | Podratzky | |
| 7,210,651 B2 | 5/2007 | Scott | |
| 2005/0151001 A1* | 7/2005 | Loper | 244/6 |
| 2009/0224096 A1* | 9/2009 | Waide et al. | 244/60 |

FOREIGN PATENT DOCUMENTS

DE    19500539    7/1995
EP    0894712    2/1999

* cited by examiner

Primary Examiner — Philip J Bonzell
(74) Attorney, Agent, or Firm — Carlson, Gaskey & Olds, P.C.

(57) ABSTRACT

An aircraft includes a powerplant system operable to power a main rotor system and a secondary thrust system, the secondary thrust system is selectively driven through operation of a clutch system, and a clutch system synchronization time corresponds to a response time of the powerplant system.

20 Claims, 5 Drawing Sheets

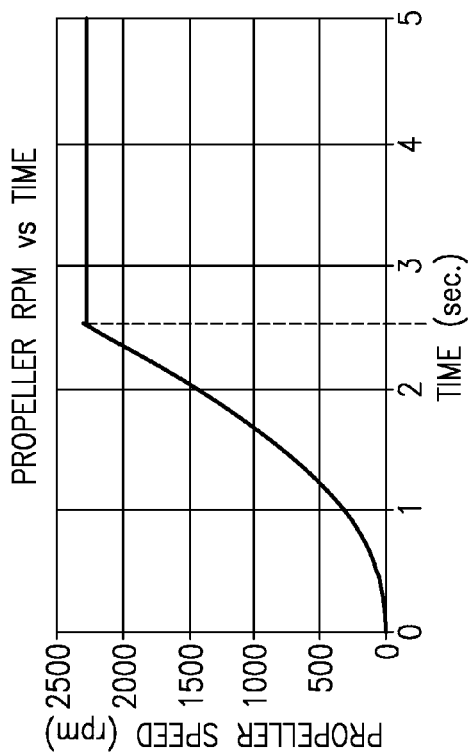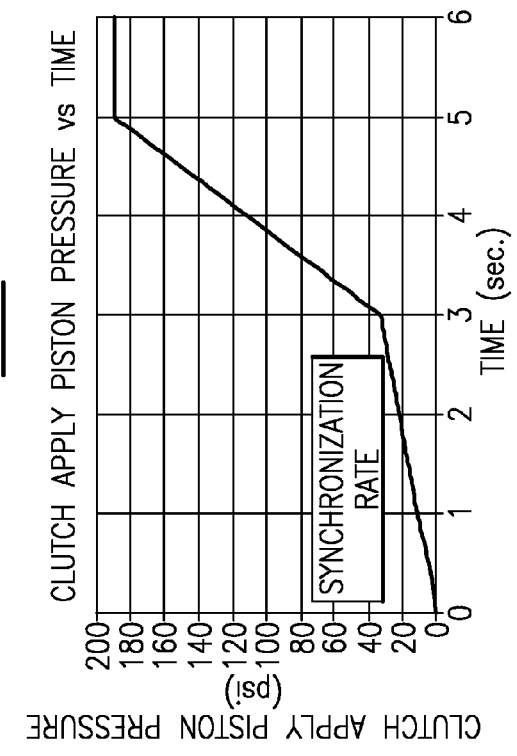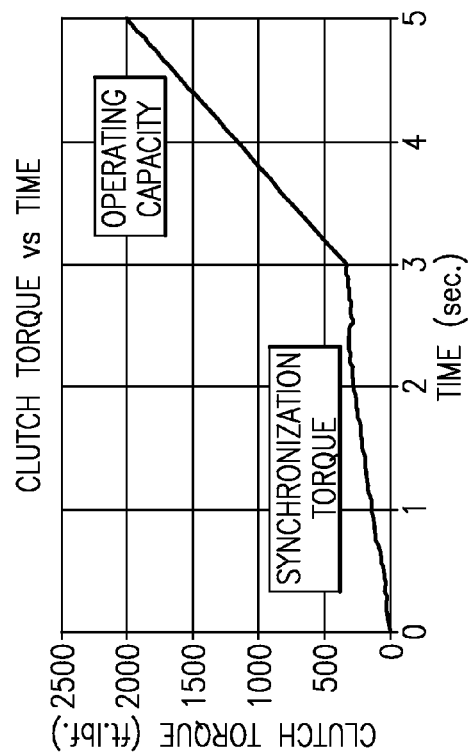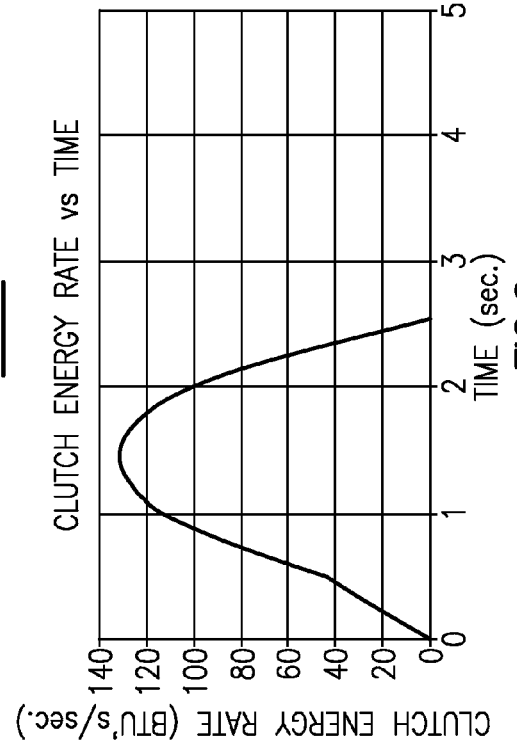

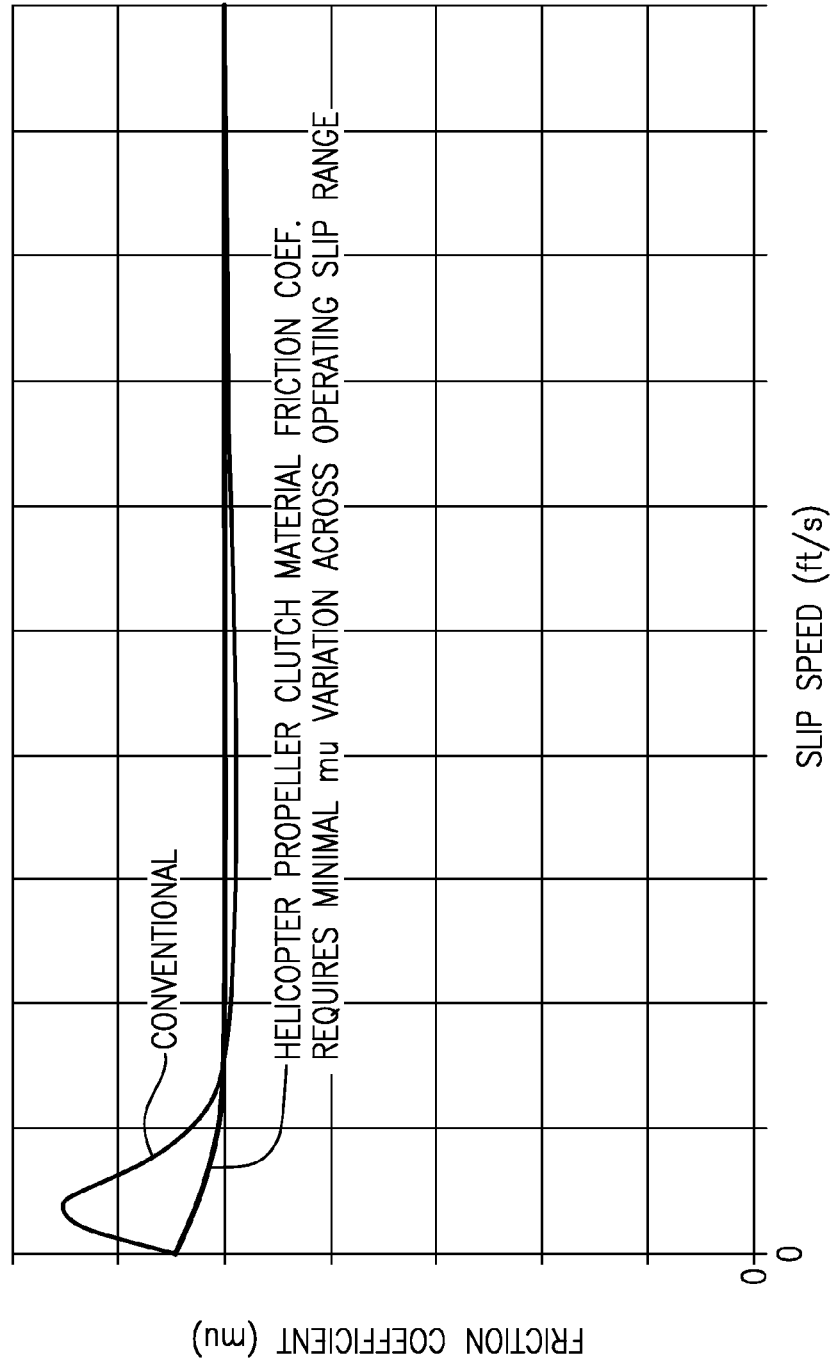

CLUTCH SYSTEM FOR ROTARY-WING AIRCRAFT WITH SECONDARY THRUST SYSTEM

BACKGROUND

The present disclosure relates to a drive system suitable for use with a rotary-wing aircraft, and more particularly to a clutch system therefor.

Automated power shifts in wet clutch system applications are typically controlled to millisecond length time periods and are completed within 10ths of a second. Such synchronization pulls energy from inertias in the system to achieve a desired shift quality.

SUMMARY

An aircraft according to an exemplary aspect of the present disclosure includes a powerplant system operable to power a main rotor system and a secondary thrust system, the secondary thrust system is selectively driven through operation of a clutch system, and a clutch system synchronization time corresponds to a response time of the powerplant system.

A method of operating a rotary wing aircraft with a secondary thrust system according to an exemplary aspect of the present disclosure includes selectively engaging a secondary thrust system over a clutch synchronization time corresponding to a response time of a powerplant system.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4 is a clutch apply piston pressure vs. time chart;

FIG. 5 is a clutch torque vs. time chart;

FIG. 6 is a clutch energy rate vs. time chart;

FIG. 7 is a secondary thrust system RPM vs. time chart; and

FIG. 8 is a clutch friction coefficient vs. slip speed chart.

DETAILED DESCRIPTION

Figure 1:
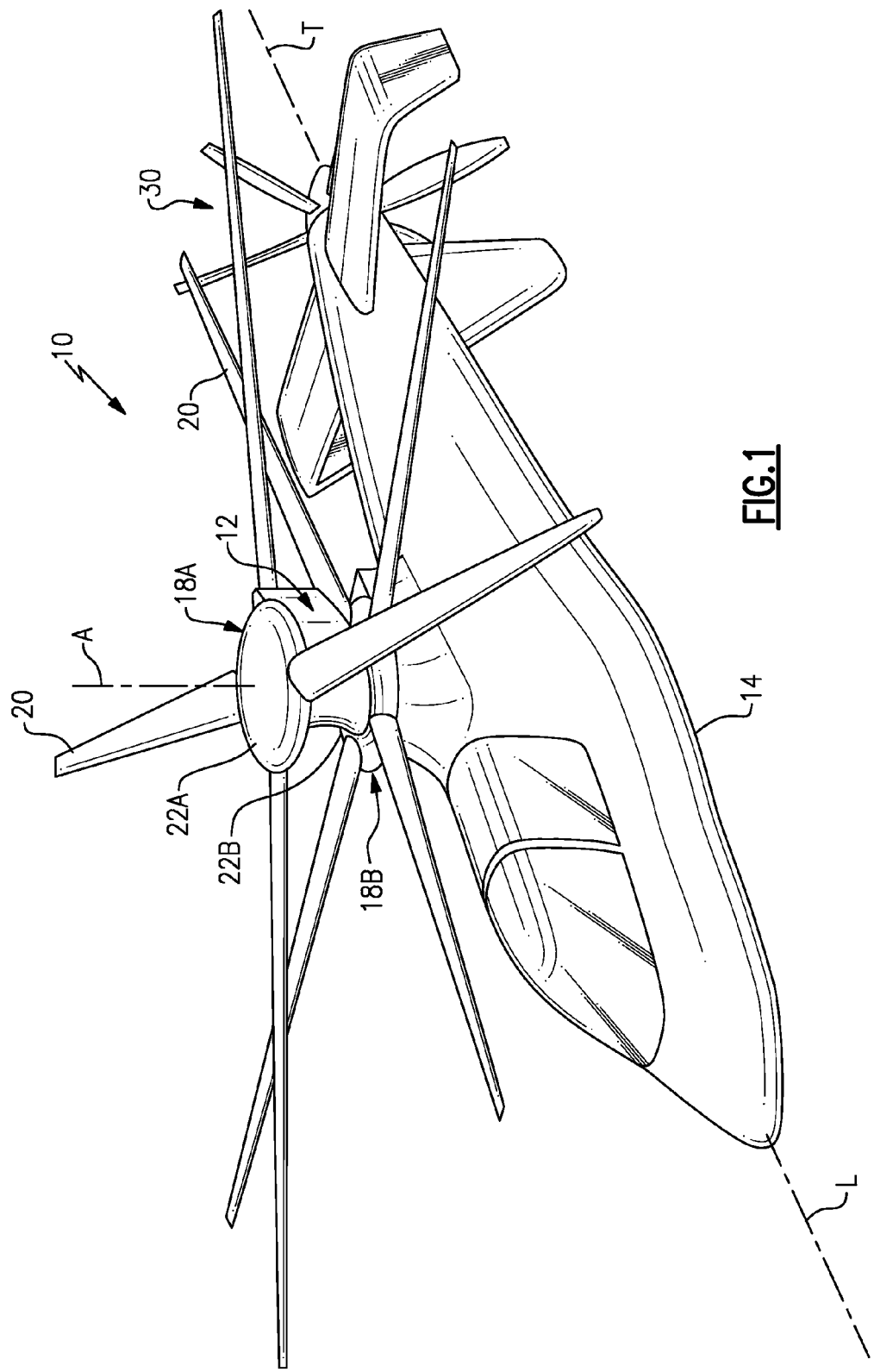
FIG. 1 is a general schematic view of an exemplary rotary wing aircraft embodiment for use with the present disclosure.

FIG. 1 schematically illustrates an exemplary high speed vertical takeoff and landing (VTOL) rotary-wing aircraft 10 having a counter-rotating, coaxial rotor system 12 which rotates about an axis of rotation A. The aircraft 10 includes an airframe 14 which supports a drive system 16 (FIG. 2) that generally includes the rotor system 12, a powertrain system 24, a power plant system 26, and a secondary thrust system 30, which may also be considered a rotor system or powered system. The secondary thrust system 30 provides secondary thrust generally parallel to an aircraft longitudinal axis L while the main rotor system 12 operates in an unloaded reverse flow state during a high-speed forward flight profile. Although a particular aircraft configuration is illustrated and described in the disclosed embodiment, other configurations and/or machines, such as high speed compound rotary-wing aircraft with supplemental secondary thrust systems, dual contra-rotating, coaxial rotor system aircraft, turbo-props, tilt-rotor, tilt-wing aircraft and non-aircraft applications will also benefit herefrom. Additionally, given this description, one of ordinary skill in the art will recognize that other types of drive systems, which may or may not be in aircraft, will also benefit from the examples herein.

The main rotor system 12 includes an upper rotor system 18A and a lower rotor system 18B. Each rotor system 18A, 18B includes a multiple of rotor blades 20 mounted to a respective rotor hub 22A, 22B for rotation about a rotor axis of rotation A. Any number of blades 20 may be used with the rotor system 12.

Figure 2:
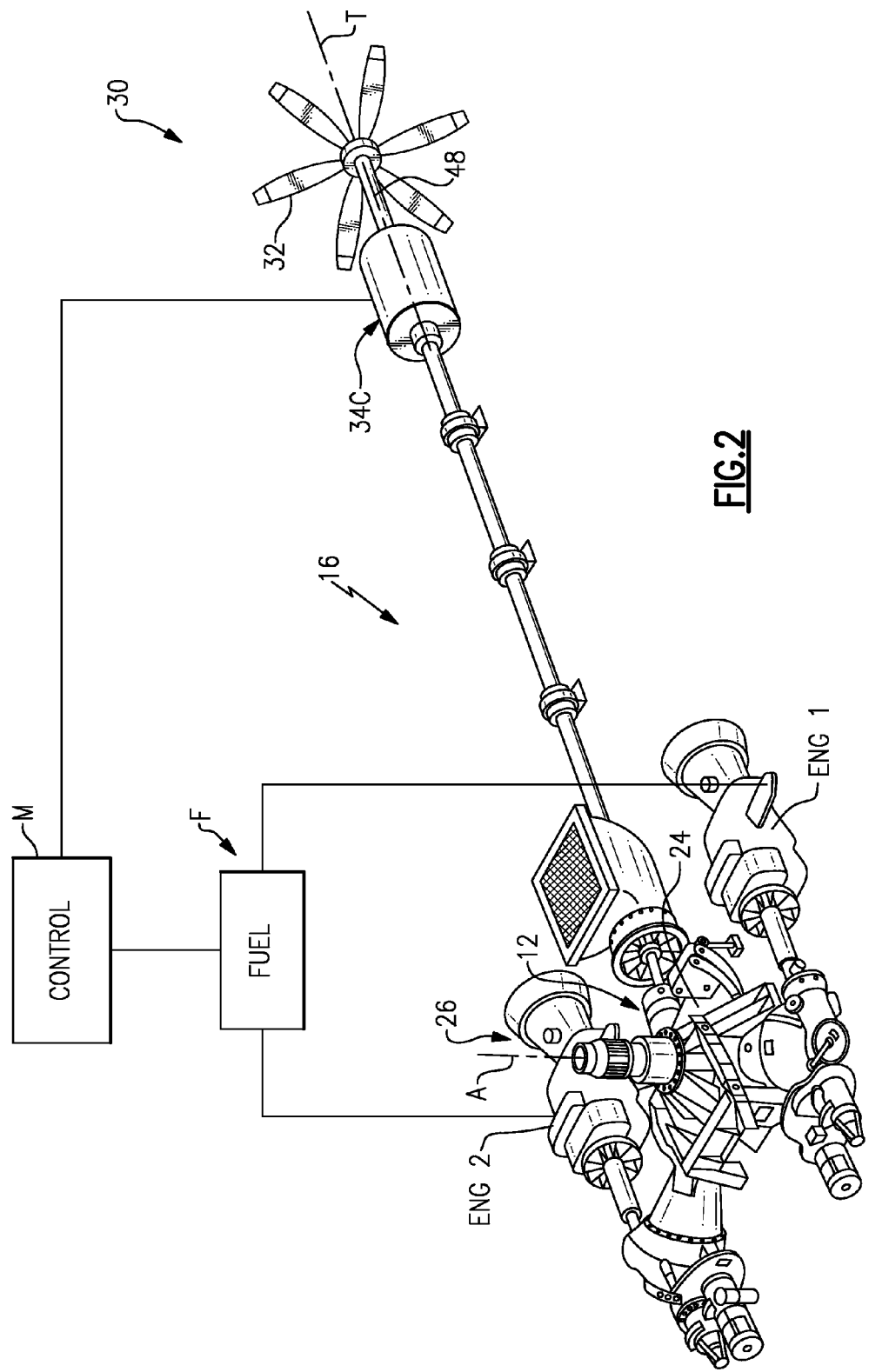
FIG. 2 is a general schematic view of a drive system for the rotary wing aircraft.

With reference to FIG. 2, the powertrain system 24 interconnects the powerplant system 26, the rotor system 12 and the secondary thrust system 30. The powertrain system 24 may include various gear systems such as main and combiner gearboxes. The powerplant system 26 generates the power available for flight operations to power the main rotor system 12 and the secondary thrust system 30 through the powertrain system 24. The powerplant system 26 in the disclosed, non-limiting embodiment includes two engine packages ENG1, ENG2, in communication with a fuel system F, however, single engine systems as well as multi-engine systems will also benefit herefrom.

The secondary thrust system 30 in one non-limiting embodiment may be mounted to the rear of the airframe 14 transverse to the axis of rotation A with a rotational axis T thereof oriented substantially horizontal and parallel to an aircraft longitudinal axis L to provide thrust for high-speed flight. It should be understood that other configurations of the secondary thrust system 30 such as a propeller system mounted to each side of the airframe, a lift fan system, or other system may alternatively be utilized. In this disclosed, non-limiting embodiment, the secondary thrust system 30 includes a pusher propeller system 32.

The powertrain system 24 may include a clutch system 34C (illustrated schematically) for selective operation of the secondary thrust system 30. The clutch system 34C is operable to control the engagement characteristics of the propeller system 32 with the powerplant system 26 to minimize the impact upon the operational speed of the main rotor system 12.

The clutch system 34C engagement characteristics assure the energy required to synchronize the propeller system 32 to the powertrain system 24 is obtained from the powerplant system 26. That is, engagement of the propeller system 32 through the clutch system 34C accelerates the propeller system 32 but does not cause a change in power provided by the main rotor system 12. Selection of, for example only, clutch system friction materials, engagement times and application rates permit the propeller system 32 to be synchronized to the powertrain system 24 in an elapsed time equal to or greater than the response time of the powerplant system 26.

The maximum additional system energy required to power the propeller system 32 can be calculated as the change in system kinetic energy in which:

Initial propeller speed=$\omega 1$ radians/sec=0

Effective propeller inertia=I x-x lbs. ft. s^2

Final propeller speed=$\omega 2$ radians/sec

Total energy required to synchronize the speed of the propeller system 32 to the clutch system 34C input speed=½ I x-x $(\omega 2)^2$ This quantity of energy is dissipated within the clutch system 34C at a slipping speed.

The instantaneous clutch system 34C power is determined by the following equation:

Clutch system power=Clutch system Slip Speed (radians/sec)×Clutch system Torque (ft. lbf.)

The clutch system 34C torque and the resultant energy rate (ft. lbf./sec) are controlled through variance, for example, of clutch system 34C pressure plate clamping load. That is, the propeller system 32 speed synchronization through the clutch system 34C is intentionally delayed to allow the powerplant system 26 to respond to the additional power demand. The spin up time lag of the powerplant system 26 is thereby correlated to an engagement time of the clutch system 34C through an extended slip period which, in the disclosed non-limiting embodiment, is greater than one second and most preferably between 2-3 seconds. The energy dissipated in the clutch system 34C and propeller system 32 is thereby provided from the powerplant system 26 and not from the momentum provided by the powertrain system 24. Coolant flow or other systems through the clutch system 34C may be utilized to prevent the clutch system 34C from overheating during the extended slip period.

Figure 3:
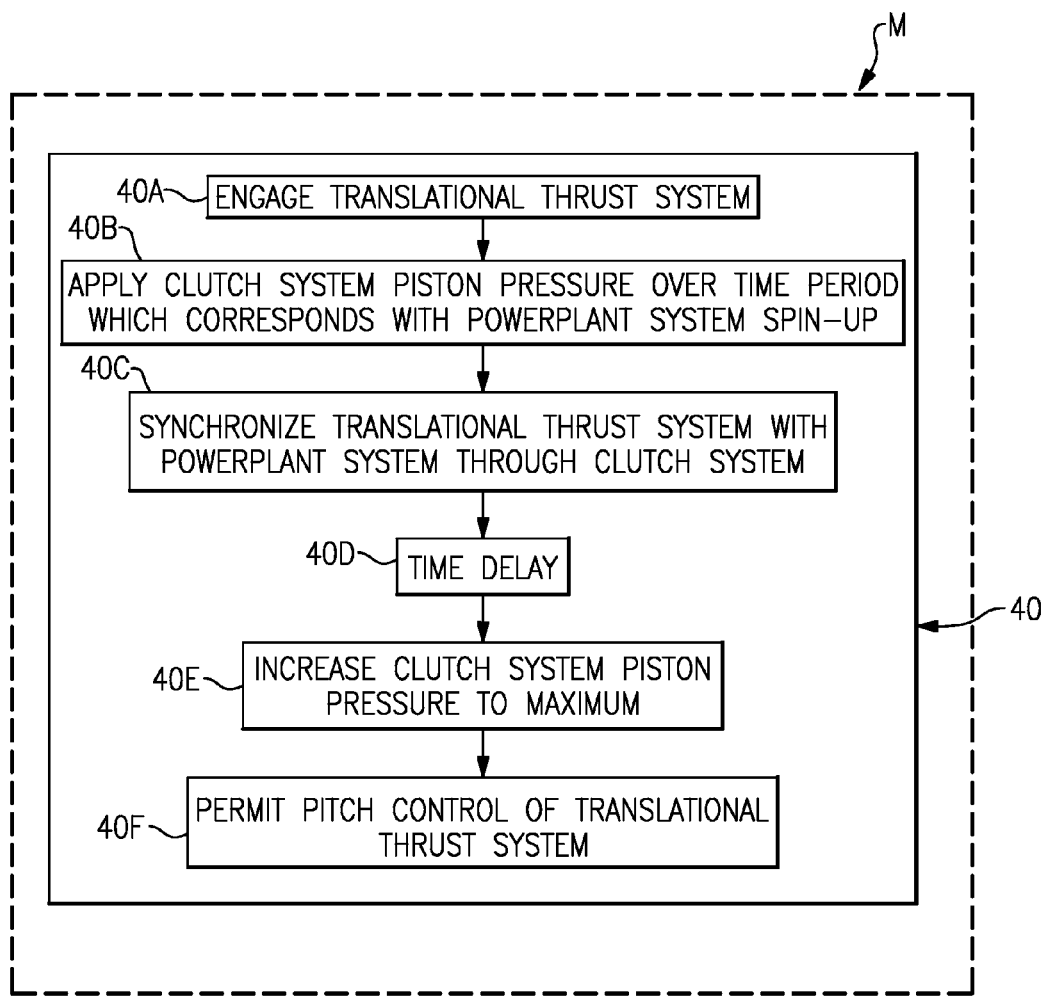
FIG. 3 is a secondary thrust system engagement flowchart.

With reference to FIG. 3, selective operation of the secondary thrust system 30 may be performed through a secondary thrust system algorithm 40 which controls, for example, the piston pressure within the clutch system 34C (FIG. 4). The functions of the secondary thrust system algorithm 40 are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment such as a control module M, or a combination thereof.

In the illustrated example, the secondary thrust system algorithm 40 controls functions 40A-F. Functions 40A-F include, respectively, engaging a translation thrust system (e.g., secondary thrust system 30), applying clutch system piston pressure over a time period which corresponds with powerplant system 26 spin-up, synchronizing translation thrust system with the powerplant system 26 through the clutch system 34C, a time delay, increasing clutch system piston pressure to maximum and permitting pitch control of the translational thrust system.

The control module M typically includes a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and the control algorithms for operation of the secondary thrust system algorithm 40 as described herein. The interface facilitates communication with the other avionics and systems. In one non-limiting embodiment, the control module M may be a portion of a flight control computer, a portion of a central vehicle control, an interactive vehicle dynamics module, a stand-alone line simulation unit or other system.

In another embodiment, the drive system 16 (FIG. 2) includes the clutch system 34C, which is operable to selectively engage and drive a rotor system, such as the secondary thrust system 30. A controller, such as the control module M, is operable to selectively engage the clutch system 34C with a predetermined time lag, as described in the examples above.

With reference to FIG. 4, the clutch apply piston pressure in one disclosed, non-limiting embodiment, is controlled to increase from 0 to about 25 psi (3.63 kPa) on a linear basis over about 3 seconds. Clutch torque (FIG. 5) increases relatively slowly over the initial 3 seconds to correspond with the powerplant system 26 fuel response time which, in the disclosed, non-limiting embodiment, is about 2 seconds plus a confirmation time delay of about 1 second. It should be appreciate that this ramp up need not be linear, however, the linear ramp up results in a parabolic shaped energy rate curve (FIG. 6). That is, the shape of the clutch energy rate curve is controlled by the clutch apply pressure curve and a linear increase provides a desired RPM output increase to the propeller system 32 (FIG. 7). Notably, the parabolic energy rate shape peaks at a time other than the synchronization time which is at about 2.5 seconds (FIG. 5). That is, the clutch system 34C is still slipping at the peak energy rate transmission of about 1.4 seconds.

The clutch system 34 synchronization torque also occurs at a relatively low clutch apply piston pressure of about 35 psi (5 kPa) which provides a clutch torque of about 300 ft. lbs. (41.5 m-kg) to avoid energy draw and reduction in power from the powertrain system 24 which may otherwise result in a rotor droop condition for the main rotor system 12. The propeller system 32 is initially synchronized at a very low clutch system 34C capacity then significantly increased to, for example, almost 2000 ft. lbs (277 m-kgs), once synchronization is achieved. That is, the initial synchronization torque occurs at a relatively low pressure then only after synchronization is the clutch apply piston pressure increased to the full transmission capacity across the clutch system 34C—about 190 psi (27.6 kPa) to provide, in the disclosed, non-limiting embodiment, the about 2000 ft. lbs (277 m-kgs) maximum operating capacity. Although synchronization occurs at 2.5-2.8 seconds, a slight time delay may be included such that full application of clutch apply piston pressure does not initiate until after approximately 3 seconds. Significant clutch apply piston pressures permits, for example, rapid pitch changes for a controlled pitch propeller system 32 to facilitate aircraft acceleration response.

With reference to FIG. 8, a conventional friction coefficient has a fairly constant value versus slip speed until approach of synchronization. As zero slip speed approaches, the friction coefficient rises rapidly, then drops off. This transition from dynamic to static friction is referred to as a "rooster tail." The "rooster tail" is avoided by the clutch system 34C through precise engagement thereof and material selection to avoid the "rooster tail" torque spike that would otherwise pull down the inertia of the system.

Precise control of engagement may be provided through, for example, selection of friction materials which display minimal variation in friction coefficient across the operating slip range; assurance that the synchronization time exceeds the engine fuel system F response time to allow the powerplant system 26 to control/maintain system speed; selection of the appropriate rate of change in clutch system torque to meet/exceed synchronization time; and through the selection of clutch system 34C features such as number of friction surfaces, clamping piston size, housing and backing plate stiffness, are made to meet the synchronization thermal loads while also producing the large torque capacity required after synchronization. It should be appreciated that one or more of the above parameters may be controlled in accordance with the teachings herein to provide the desired aircraft response.

Rotary wing aircraft utilize particular oils, such as DOD-L-85734, that include significant anti-wear additives with which a clutch disk friction material such as BW4300 has been selected in the disclosed non-limiting embodiment to provide one example which achieves minimal variation in the friction coefficient across the operating slip range of the clutch system 34C to avoid a "rooster tail." It should be appreciated, however, that other combinations of materials for other slip ranges and torque capacities may be determined based on factors such as friction characteristics, material/oil compatibility, friction vs. slip relationship, and material thermal durability.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An aircraft comprising:
   a main rotor system;
   a secondary thrust system;
   a powerplant system operable to power said main rotor system and said secondary thrust system, said secondary thrust system selectively driven through operation of a clutch system, said clutch system being selectively moveable over a variable synchronization time between a disengaged position, a slipping position a fully engaged position; and
   a controller in communication with said clutch system and being operable to change said variable synchronization time in response to a variable response time of said powerplant system such that said variable synchronization time is equal to or greater than said variable response time, said variable response time corresponding to an increase power demand of said secondary thrust system in addition to said main rotor system.

2. The aircraft as recited in claim 1, wherein said variable synchronization time and said variable response time of said powerplant system is between 2 and 3 seconds.

3. The aircraft as recited in claim 1, wherein said controller is configured to synchronize said clutch system with respect to a momentum of said main rotor system.

4. The aircraft as recited in claim 1, wherein said main rotor system defines a first axis of rotation being transverse to a second axis of rotation defined by said secondary thrust system.

5. The aircraft as recited in claim 1, wherein said clutch system includes a BW4300 friction material.

6. The aircraft as recited in claim 1, wherein said variable synchronization time and said variable response time of said powerplant system is greater than about 1 second.

7. The aircraft as recited in claim 6, wherein said variable synchronization time and said variable response time of said powerplant system is less than about 3 seconds.

8. The aircraft as recited in claim 1, said secondary thrust system comprising:
   a plurality of blades, and
   a pitch control mechanism configured to selectively adjust a pitch of said plurality of blades;
   wherein said controller is operable to permit pitch control of said pitch control mechanism when said clutch system is positioned in said engaged position.

9. The aircraft as recited in claim 8, wherein said controller is operable to deny requests for pitch control of said pitch control mechanism when said clutch system is positioned in said slipping position.

10. A method of operating a rotary wing aircraft with a secondary thrust system comprising:
    calculating a variable response time of a powerplant system corresponding to an increased power demand of a secondary thrust system in addition to a main rotor system, each of the main rotor system and the secondary thrust system being operably coupled to the powerplant system, said secondary thrust system being selectively driven through a clutch system;
    changing a variable clutch synchronization time in response to said variable response time such that said variable clutch synchronization time is equal to or greater than said variable response time; and
    moving said clutch system over said variable clutch synchronization time between a disengaged position, a slipping position and a fully engaged position.

11. The method as recited in claim 10, further comprising:
    defining the variable response time of the powerplant system with respect to a time delay for an increase in fuel to the powerplant system.

12. The method as recited in claim 10, further comprising:
    defining the variable clutch synchronization time to be greater than 1 second.

13. The method as recited in claim 10, further comprising:
    defining the variable clutch synchronization time to be between 2-3 seconds.

14. The method as recited in claim 10, further comprising:
    defining said variable response time of said powerplant system with respect to a confirmation delay.

15. The method as recited in claim 10, further comprising:
    increasing a clutch apply piston pressure over time to define a first synchronization rate until clutch synchronization; and
    increasing the clutch apply piston pressure over time to define a second synchronization rate after clutch synchronization.

16. The method as recited in claim 15, further comprising:
    increasing the clutch apply piston pressure over time to define the first synchronization rate to achieve a clutch torque less than 500 ft. lbs; and
    increasing the clutch apply piston pressure over time to define the second synchronization rate to achieve a clutch torque greater than 2000 ft. lbs.

17. The method as recited in claim 15, further comprising:
    increasing the clutch apply piston pressure to less than 40 psi until clutch synchronization; and
    increasing the clutch apply piston pressure to greater than 180 psi after clutch synchronization.

18. The method as recited in claim 15, further comprising:
defining the first synchronization rate to be greater than the second synchronization rate.

19. The method as recited in claim 18, further comprising:
defining the first synchronization rate to occur over the variable clutch synchronization time of between 2-3 seconds.

20. The method as recited in claim 18, further comprising:
defining the second synchronization rate to occur over a time less than 3 seconds.

* * * * *